United States Patent
Chou et al.

(10) Patent No.: US 11,099,849 B2
(45) Date of Patent: Aug. 24, 2021

(54) METHOD FOR REDUCING FETCH CYCLES FOR RETURN-TYPE INSTRUCTIONS

(71) Applicant: Oracle International Corporation, Redwood City, CA (US)

(72) Inventors: Yuan Chou, Los Gatos, CA (US); Manish Shah, Austin, TX (US); Richa Aggarwal, Austin, TX (US)

(73) Assignee: Oracle International Corporation, Redwood Shores (CA)

( * ) Notice: Subject to any disclaimer, the term of this patent is extended or adjusted under 35 U.S.C. 154(b) by 355 days.

(21) Appl. No.: 15/254,648

(22) Filed: Sep. 1, 2016

(65) Prior Publication Data

US 2018/0060075 A1    Mar. 1, 2018

(51) Int. Cl.
*G06F 9/38* (2018.01)

(52) U.S. Cl.
CPC .......... *G06F 9/3806* (2013.01); *G06F 9/3844* (2013.01); *G06F 9/3848* (2013.01)

(58) Field of Classification Search
CPC ..... G06F 9/00–3897; G06F 15/00–825; G06F 9/3005; G06F 9/30054; G06F 9/30058; G06F 9/30061; G06F 9/30065; G06F 9/32; G06F 9/321; G06F 9/322; G06F 9/324; G06F 9/325; G06F 9/327; G06F 9/328; G06F 9/3802; G06F 9/3804; G06F 9/3806; G06F 9/3808; G06F 9/381; G06F 9/3814; G06F 9/3842; G06F 9/3844; G06F 9/3846; G06F 9/3848; G06F 9/3861

See application file for complete search history.

(56) References Cited

U.S. PATENT DOCUMENTS

| 5,454,087 A * | 9/1995 | Narita ................... G06F 9/3806 712/240 |
| 5,604,877 A * | 2/1997 | Hoyt ..................... G06F 9/3806 712/243 |

(Continued)

FOREIGN PATENT DOCUMENTS

GB    2493243 A  *  1/2013  ....... G06F 17/30286

OTHER PUBLICATIONS

M. Breternitz et al., "A Segmented Bloom Filter Algorithm for Efficient Predictors," 2008 20th International Symposium on Computer Architecture and High Performance Computing, Campo Grande, MS, 2008, pp. 123-130. (Year: 2008).*

*Primary Examiner* — Keith E Vicary
(74) *Attorney, Agent, or Firm* — Kowert, Hood, Munyon, Rankin & Goetzel, P.C.

(57) ABSTRACT

An apparatus includes a branch target cache configured to store one or more branch addresses, a memory configured to store a return target stack, and a circuit. The circuit may be configured to determine, for a group of one or more fetched instructions, a prediction value indicative of whether the group includes a return instruction. In response to the prediction value indicating that the group includes a return instruction, the circuit may be further configured to select a return address from the return target stack. The circuit may also be configured to determine a hit or miss indication in the branch target cache for the group, and to, in response to receiving a miss indication from the branch target cache, select the return address as a target address for the return instruction.

20 Claims, 9 Drawing Sheets

(56) References Cited

U.S. PATENT DOCUMENTS

| | | | | |
|---|---|---|---|---|
| 5,606,682 A * | 2/1997 | McGarity | G06F 9/3806 | |
| | | | 711/123 | |
| 5,623,614 A * | 4/1997 | Van Dyke | G06F 9/3806 | |
| | | | 712/240 | |
| 5,687,349 A | 11/1997 | McGarity | | |
| 5,706,491 A | 1/1998 | McMahan | | |
| 5,768,576 A | 6/1998 | Hoyt | | |
| 5,812,838 A * | 9/1998 | Dhong | G06F 9/3844 | |
| | | | 712/239 | |
| 5,864,707 A | 1/1999 | Tran | | |
| 5,974,543 A * | 10/1999 | Hilgendorf | G06F 9/3806 | |
| | | | 712/240 | |
| 6,253,315 B1 * | 6/2001 | Yeh | G06F 9/3806 | |
| | | | 712/238 | |
| 6,530,016 B1 * | 3/2003 | Ukai | G06F 9/30054 | |
| | | | 712/237 | |
| 6,560,696 B1 | 5/2003 | Hummel | | |
| 6,609,194 B1 * | 8/2003 | Henry | G06F 9/322 | |
| | | | 711/213 | |
| 6,957,327 B1 * | 10/2005 | Gelman | G06F 9/3844 | |
| | | | 712/237 | |
| 2004/0003213 A1 * | 1/2004 | Bockhaus | G06F 9/3806 | |
| | | | 712/233 | |
| 2005/0076193 A1 | 4/2005 | Henry | | |
| 2005/0257264 A1 * | 11/2005 | Stolfo | G06F 21/552 | |
| | | | 726/23 | |
| 2006/0242393 A1 * | 10/2006 | Park | G06F 9/30061 | |
| | | | 712/240 | |
| 2008/0288753 A1 * | 11/2008 | Stempel | G06F 9/30058 | |
| | | | 712/213 | |
| 2013/0318051 A1 * | 11/2013 | Kumar | G06F 17/30156 | |
| | | | 707/692 | |
| 2014/0149726 A1 * | 5/2014 | Dieffenderfer | G06F 9/3808 | |
| | | | 712/239 | |
| 2014/0250289 A1 * | 9/2014 | Pota | G06F 9/3867 | |
| | | | 712/240 | |
| 2014/0344558 A1 * | 11/2014 | Holman | G06F 9/3806 | |
| | | | 712/239 | |
| 2015/0234663 A1 * | 8/2015 | Chishti | G06F 9/3808 | |
| | | | 712/207 | |
| 2016/0350232 A1 * | 12/2016 | Knies | G06F 12/0888 | |

* cited by examiner

US 11,099,849 B2

METHOD FOR REDUCING FETCH CYCLES FOR RETURN-TYPE INSTRUCTIONS

BACKGROUND

Field of the Invention

The embodiments described herein relate to processors and, more particularly, to a method for predicting branch addresses.

Description of the Related Art

Some processing cores include branch prediction circuits to improve performance by predicting if fetched branch instructions will branch to a new address or continue down a current program flow. Branch prediction circuits work by tracking if a given branch instruction takes the branch address or not during each execution of the given instruction. After the instruction has been executed several times, a branch history is collected and a reasonably accurate prediction may be possible for the next occurrence for the given instruction. Branch prediction circuits may use the address of the branch instruction as an identifier for tracking its branching history. When a branch instruction at a tracked address is fetched, the branch prediction circuits may read the instruction's history and use the history to predict if the branch instruction will take its branch or not.

Call and return instructions are two types of branch instructions. Call instructions may be used to cause program flow to change to a subroutine within a main program. Return instructions may be used to mark an end to the subroutine and return the program to an address following the call instruction that invoked the subroutine. A given call instruction may call the same subroutine, making predictions for this instruction straightforward. Return instructions, to the contrary, may be difficult to predict. Depending on how a software program is written, a given subroutine may be called by more than one call instruction, each instruction at a different address. Since a return instruction branches (i.e., takes a branch path) to an address based on the address of the call instruction, the return address will differ for each of the call instructions, making predictions more difficult.

SUMMARY

Various embodiments of a system, a method and an apparatus are disclosed in which the apparatus may include a branch target cache configured to store one or more branch addresses, a memory configured to store a return target stack including one or more return addresses, and a circuit. The circuit may be configured to determine, for a group of one or more fetched instructions, a prediction value indicative of whether the group includes a return instruction. In response to the prediction value indicating that the group includes a return instruction, the circuit may be further configured to select a return address from the return target stack. The circuit may also be configured to determine a hit or miss indication in the branch target cache for the group of one or more fetched instructions, and to, in response to receiving a miss indication from the branch target cache, select the return address as a target address for the return instruction.

In a further embodiment, the circuit may be further configured to, in response to receiving a hit indication from the branch target cache, select a branch address from the branch target cache as the target address for the return instruction. In another embodiment, the circuit may be further configured to store the return address in the return target stack in response to a determination that a previously fetched instruction is a call instruction.

In one embodiment, the circuit may be further configured to fetch a second group of one or more instructions. In response to a determination that the second group includes a return instruction, the circuit may be configured to set a second prediction value to indicate that the second group includes a return instruction.

In another embodiment, to determine the prediction value, the circuit may be further configured to access a first entry in a first prediction table using a first portion of an address value corresponding to the group of one or more fetched instructions, and to access a second entry in a second prediction table using a second portion of the address value. In a further embodiment, the circuit may also be configured to initialize the first prediction table and the second prediction table in response to a determination that a predetermined number of groups of one or more instructions have been fetched.

In a given embodiment, the circuit may be further configured to increment a count value in response to a determination that a given selected return address is incorrect for a corresponding return instruction. The circuit may also be configured to initialize the first prediction table and the second prediction table in response to a determination that the count value has reached a predetermined threshold.

BRIEF DESCRIPTION OF THE DRAWINGS

The following detailed description makes reference to the accompanying drawings, which are now briefly described.

Figure 1:
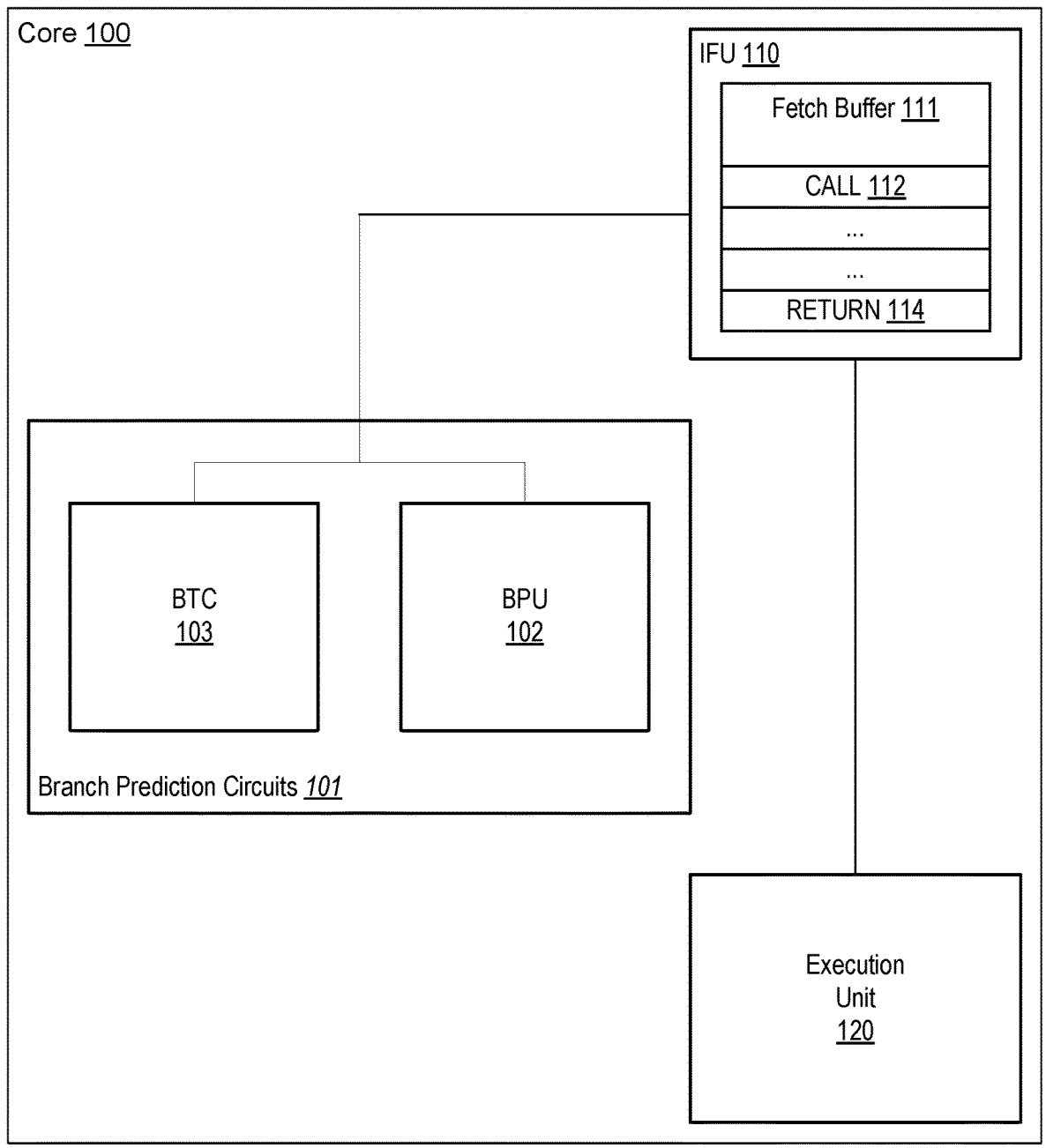
FIG. 1 illustrates a block diagram of an embodiment of a processing core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, a number of cores included in the processor, and speed of the memory accesses. One method for improving performance is to prefetch instructions for execution so that the instructions are decoded and ready to execute when an execution unit in the core gets to the instruction. Branch instructions, however, may complicate instruction prefetching, as they may redirect program flow to an associated target address. At least some branch instructions may be conditional, in which they either take a branch to the target address or continue with a contiguous program flow to a following instruction dependent upon one or more conditions of the core at the time of execution of the branch instruction. Since the condition at the time of execution is not known, a prediction may be made if the branch instruction will take the branch or not.

Branch prediction circuits may be used to track branch instructions, collecting a history of executed branch instructions, capturing if the branch instruction takes or skips its branch. Branch prediction circuits may generate a prediction for a fetched branch instruction, indicating if it is likely to take the associated branch or not. If the indication is for taking the branch, then the next instruction prefetch may use the target address. While branch prediction may help improve a core's performance, the prediction process can take multiple processing cycles to determine a target address in response to a prediction that the branch will be taken. In some circumstances, the branch prediction may fall behind an execution unit's ability to execute instructions, and reduce instruction throughput. To improve the speed for determining a target address, some processing cores may include a branch target cache (BTC). The BTC stores branch target addresses for branch instructions that have been predicted as taken. Call and return instructions may, however, pose an obstacle for accurate predictions from a BTC. The BTC relies on a branch instruction re-using a previous target instruction. A call instruction is used to branch to a subroutine, and a return instruction is used to end the subroutine and return program flow to an instruction following the respective call instruction. While some call instructions branch to a same subroutine each time the call instruction is executed, multiple call instructions may be used to branch to a given subroutine. The given subroutine's corresponding return instruction may, therefore, have various target addresses depending upon which of the multiple call instructions caused the last branch to the subroutine.

A process for tracking call and return instructions, and their respective return addresses, is desired. Embodiments for systems and methods for tracking and identifying return instructions are presented herein.

It is noted that, as used herein, an "issued," "issuing," or to "issue" an instruction refers to selecting an instruction to be executed by a processor core. In a processor core that only supports in-order execution, issuing may consist of selecting a next instruction in a series of instructions. In a processor core that allows out-of-order processing, the core may include circuitry that selects an instruction to be issued ahead of a previously received instruction if the previously received instruction is stalled (e.g., cannot start or complete execution due to a resource limitation). In the embodiments presented herein, out-of-order processing of instructions is permitted.

A block diagram of an embodiment of a processing core is illustrated in FIG. 1. In the illustrated embodiment, core 100 includes branch prediction circuits 101 coupled to instruction fetch unit (IFU) 110, which is, in turn, coupled to execution unit 120. Branch prediction circuits 101 include branch prediction unit (BPU) 102 and branch target cache (BTC) 103. IFU 110 includes fetch buffer 111.

In the illustrated embodiment, branch prediction circuits 101 are used to predict branch outcomes and/or fetch target addresses. Branch prediction circuits 101 includes BPU 102, which includes logic circuits to track if executed branch instructions take their respective branches or not. BPU 102 may use a branch history table to track a number of times a branch instruction takes a branch versus how often the branch is not taken. BPU 102 may also track patterns of taking or not taking a particular branch. Using the data collected in the history table, BPU 102 determines a prediction value indicating if a given branch will be taken or not. BPU 102 may also determine a target branch address when a given branch instruction is predicted to take its branch.

Branch prediction circuits 101 also include BTC 103. Although BPU 102 may determine a target address for a predicted taken branch, the time for determining the target address may cause wasted cycles in a fetch pipeline of core 100. To mitigate these wasted cycles, branch prediction circuits 101 may use BTC 103 to cache previously used target addresses. If a fetched branch instruction has a corresponding entry in BTC 103 (a BTC "hit"), then fetching may continue using the target address in the corresponding entry. If a corresponding entry is not found for the fetched branch instruction (a BTC "miss"), then program fetches will continue dependent upon a result from BPU 102.

BPU 102 may continue to process the fetched branch instruction in parallel with BTC 103 determining a cache hit or miss. Upon determining its target address for the fetched branch instruction, BPU 102 may compare its determined target address to the cached target address. If the two addresses match, then instruction fetching may continue using the cached target address. If there is a mismatch, however, then instructions fetched using the cached address are discarded and the instruction fetching restarts using the determined target address from BPU 102.

Instruction fetch unit (IFU) 110 may be configured to retrieve instructions for execution in core 100. In the illustrated embodiment, IFU 110 performs various operations relating to the fetching of instructions from cache or memory, and the decoding of instructions prior to the instructions being issued for execution. Instruction fetch unit 110 includes fetch buffer 111 to store fetched instructions before they are sent to execution unit 120. As illustrated, fetch buffer 111 is shown with several fetched instructions including CALL 112 and RETURN 114. In various embodiments, IFU 110 may fetch a single instruction or multiple instructions per fetch operation. In embodiments in which multiple instructions are fetched in a single fetch operation, the group of instructions may be referred to as a "fetch group."

In one embodiment, IFU 110 is configured to maintain a pool of fetched, ready-for-issue instructions to be executed by core 100. IFU 110 may receive branch predictions and/or corresponding target addresses from branch prediction circuits 101 after a branch instruction has been fetched and stored in fetch buffer 111. This target address is used for further instruction fetches. Upon a determination that a branch direction has been mispredicted, IFU 110 may flush fetch buffer 111 and restart instruction fetches following the mispredicted branch instruction using an address value determined from the execution of the branch instruction.

Execution unit 120 may be configured to process and provide results for instructions issued from IFU 110. In some embodiments, execution unit 120 may be configured to execute certain integer-type instructions defined in the implemented ISA, such as arithmetic, logical, and shift instructions, while other instructions, such as, for example, floating point arithmetic instructions may be executed by a coprocessor, such as a floating point unit (not shown). It is contemplated that in some embodiments, core 100 may include more than one execution unit 120, and each of the execution units may or may not be symmetric in functionality.

It is noted that FIG. 1 is merely an example of a processing core. For clarity, the processing core of FIG. 1 has been simplified to shown only functional circuits related to the disclosed concepts. In other embodiments, core 100 may include additional functional circuits, such as, for example, multiple execution units and/or one or more coprocessing units (e.g., a floating point unit or a cryptography accelerator).

Figure 2:
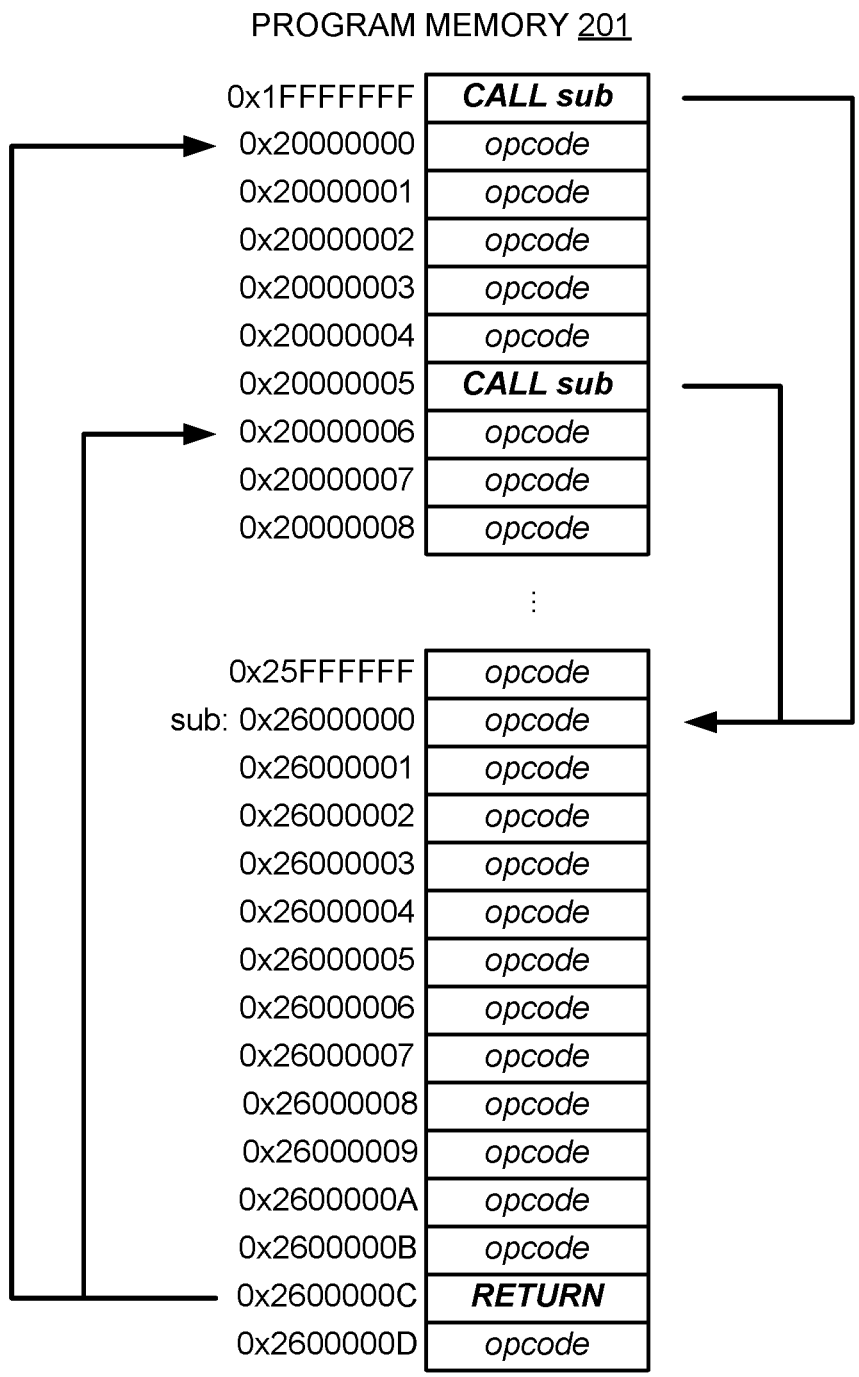
FIG. 2 shows an embodiment of an organization of program instructions in a program memory.

Turning to FIG. 2, an embodiment of an organization of program instructions in a program memory is illustrated. In the illustrated embodiment, program memory 201 includes instructions that may be executed by a processing core, such as, for example, core 100 in FIG. 1.

Program memory 201 includes two memory segments. The first segment includes instructions located at addresses 0x1FFFFFFF through 0x20000008, which may, in some embodiments, correspond to a main program loop. The first segment includes two call instructions to a subroutine labeled "sub" in the second memory segment. The second memory segment includes instructions located at addresses 0x25FFFFFF through 0x2600000D, including instructions for subroutine "sub" starting at address 0x26000000. A return instruction is located at address 0x2600000C.

In the illustrated embodiment, when core 100 fetches the "CALL sub" instruction at 0x1FFFFFFF, branch prediction circuits 101 may produce a branch target address corresponding to location 0x26000000, the start of the subroutine "sub." In parallel, BPU 102 and BTC 103 each determines if an entry corresponding to address 0x1FFFFFFF exists, and if so, each determines a predicted target address. If the "CALL sub" instruction is being executed for the first time, or if BPU 102 and BTC 103 have been reinitialized since the last time the instruction was fetched, then BPU 102 and/or BTC 103 may create new entries, using a target address generated when the CALL instruction is executed. Otherwise, existing entries are read to determine the target address. Since, at least in the current example, call instructions will always branch to the corresponding subroutine, the target address is determined to be 0x26000000.

IFU 110 fetches instructions from locations 0x2600000 at least through 0x2600000C, where the "RETURN" instruction is located. After fetching the "RETURN" instruction, BPU 102 and BTC 103 may again determine if a corresponding entry exists for location 0x2600000C. Similar to the description above for the CALL instruction, assuming no entry exists in either BPU 102 or BTC 103, then entries may be created using a target address determined during execution of the RETURN instruction, i.e., the location following the CALL instruction, 0x20000000. As the program flow continues, the second CALL instruction at location 0x20000005 is fetched, and the described process is repeated for determining the target address of 0x26000000. When the RETURN instruction is reached at 0x2600000C, however, both BPU 102 and BTC 103 have entries corresponding to the previous execution of the RETURN instruction when the target address was 0x20000000. Since the subroutine "sub" was called from a different CALL instruction, at 0x20000005, the target return address should be 0x20000006. BTC 103, however, will have the previously determined address of 0x20000000. BPU 102 may also store a target address of 0x20000000 for the RETURN instruction, and the erroneous target address of 0x2000000 may be sent to IFU 110 which will start prefetching instructions from the wrong address. Once the RETURN instruction is executed, the correct target address is determined and the misprediction indicated, causing fetch buffer 111 to be flushed, and the entries corresponding to the RETURN instruction in BPU 102 and BTC 103 to be evicted. Such a process may cause execution unit 120 to stall for multiple cycles while instructions are fetched and decoded from the correct address.

In some embodiments, BPU 102 may recognize the instruction at location 0x2600000C as a RETURN instruction, and determine the target return address correctly. In this case, however, the time for BPU 102 to determine the correct address may impact performance compared to if a correct address was available from BTC 103.

It is noted that FIG. 2 is one example of program instructions stored in a program memory. Program instruction may be compiled in many different forms. The memory addresses used are merely examples, and may correspond to logical or physical addresses. In other embodiments, the instructions may be stored in any valid memory locations. Additionally, although addresses are shown to increment by one, address increments for consecutive instructions may increment by any suitable value based on a type of memory and a length of each instruction.

Figure 3:
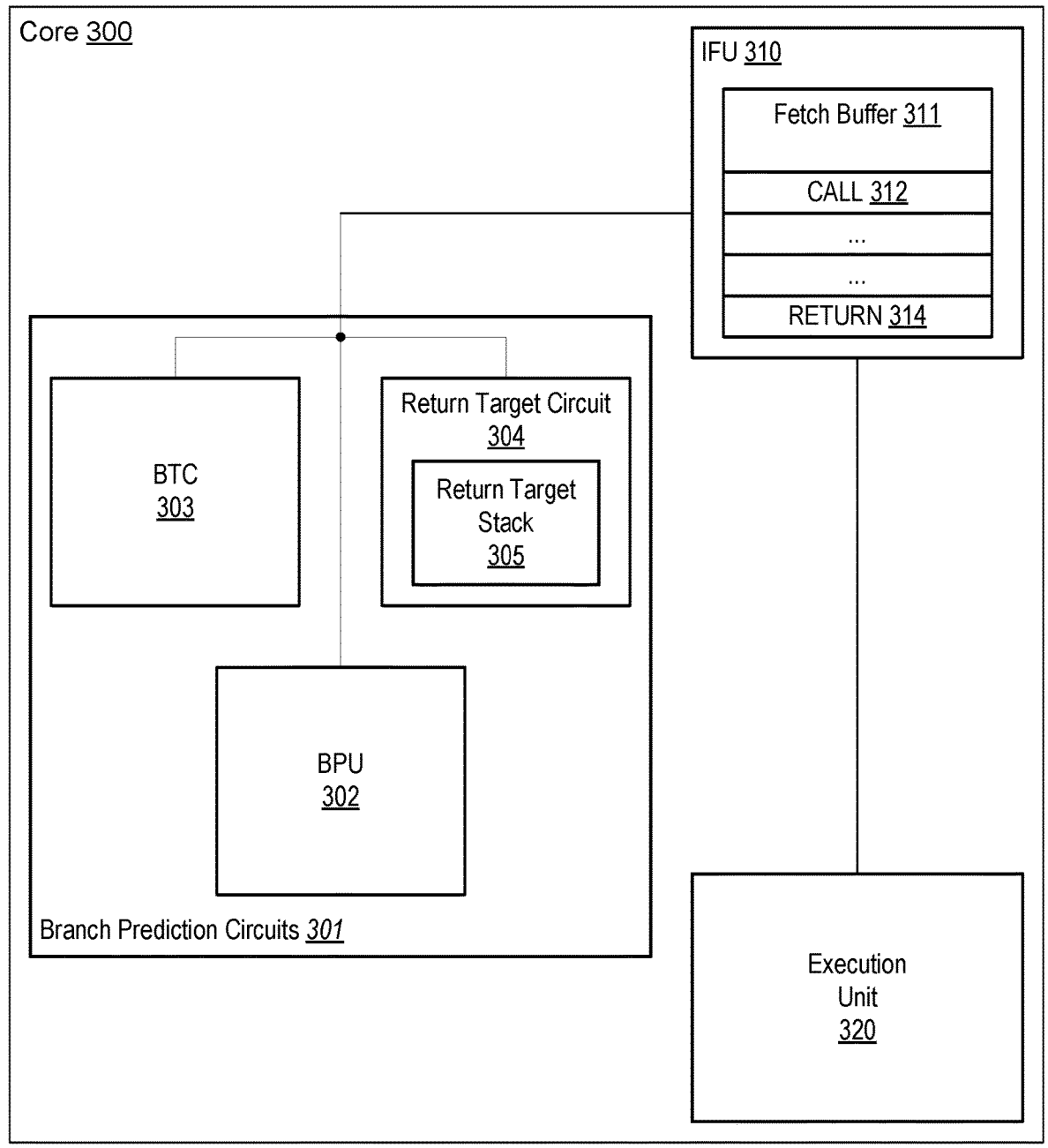
FIG. 3 shows a block diagram of another embodiment of a processing core.

Moving to FIG. 3, a block diagram of another embodiment of a processing core is shown. Core 300, in the illustrated embodiment, includes branch prediction circuits 301 coupled to instruction fetch unit (IFU) 310, which is, in turn, coupled to execution unit 320. Branch prediction circuits 301 include branch prediction unit (BPU) 302, branch target cache (BTC) 303, and return target circuit 304. IFU 310 includes fetch buffer 311, and return target circuit 304 includes return target stack 305.

Core 300 includes several circuit blocks that are similar to corresponding circuit blocks in core 100. Operation of IFU 310, fetch buffer 311 and execution unit 320 may be as described above in regards to IFU 110, fetch buffer 111 and execution unit 120 in FIG. 1. Operation of BPU 302 and BTC 303 may also correspond to the descriptions provided above in regards to the similarly named circuit blocks in FIG. 1.

In the illustrated embodiment, return target circuit 304 is used to track occurrences of CALL and RETURN instructions. After a CALL instruction is detected in a fetch group, such as, e.g., CALL 312, a return address is determined and stored at the top of return target stack 305. The return address may correspond to an address of an instruction following CALL 312 in the program memory. Return target stack 305 may correspond to a last-in-first-out (LIFO) data structure stored in a suitable memory accessible by core 300. When written to, a LIFO data structure stores received data in a first available memory location, and when read, retrieves the most recently stored data.

After a RETURN instruction is detected in a fetch group, the return address is read from return target stack 305, by retrieving the most recently stored return address. Return target circuit 304 uses an address associated with the fetch group to determine if a RETURN instruction is included in one or more fetched instructions. If return target circuit 304 determines that a RETURN instruction, such as, for example, RETURN 314, is included in the current fetch group, then return target circuit 304 reads a last address value from return target stack 305.

In some embodiments, the address read by return target circuit 304 may be used as the return address without further consideration. In other embodiments, however, BTC 303 and BPU 302 may operate in parallel to determine branch addresses for RETURN 314. If both BTC 303 and return target circuit 304 generate addresses corresponding to RETURN 314, then branch prediction circuits 301 may select the address received from BTC 303.

It is noted, that as used herein, "parallel" operation is not intended to imply that two operations begin and end simultaneously. Instead, "parallel" indicates that two or more operations, each having independent start and end times, may overlap at least a portion of their execution time.

Return target circuit 304 may use any suitable means for determining if a RETURN instruction is included within a given fetch group. For example, a lookup table indexed with an encoded value based on the fetch address may be used to indicate fetch groups including RETURN instructions. A return target circuit that uses two Bloom filters for indicating a presence of RETURN instructions will be presented below.

Upon an initial fetching of RETURN 314, a corresponding entry in the lookup table or tables may be clear. When RETURN 314 is decoded, and identified as such, then return target circuit 304 updates the corresponding entry in the lookup table to indicate that the fetch group includes a RETURN instruction.

It is noted that FIG. 3 is merely an example of a processing core. Only some circuit blocks are included for clarity. In other embodiments, additional circuit blocks may be included, such as, for example, an instruction scheduling unit and/or a memory management unit.

Figure 4:
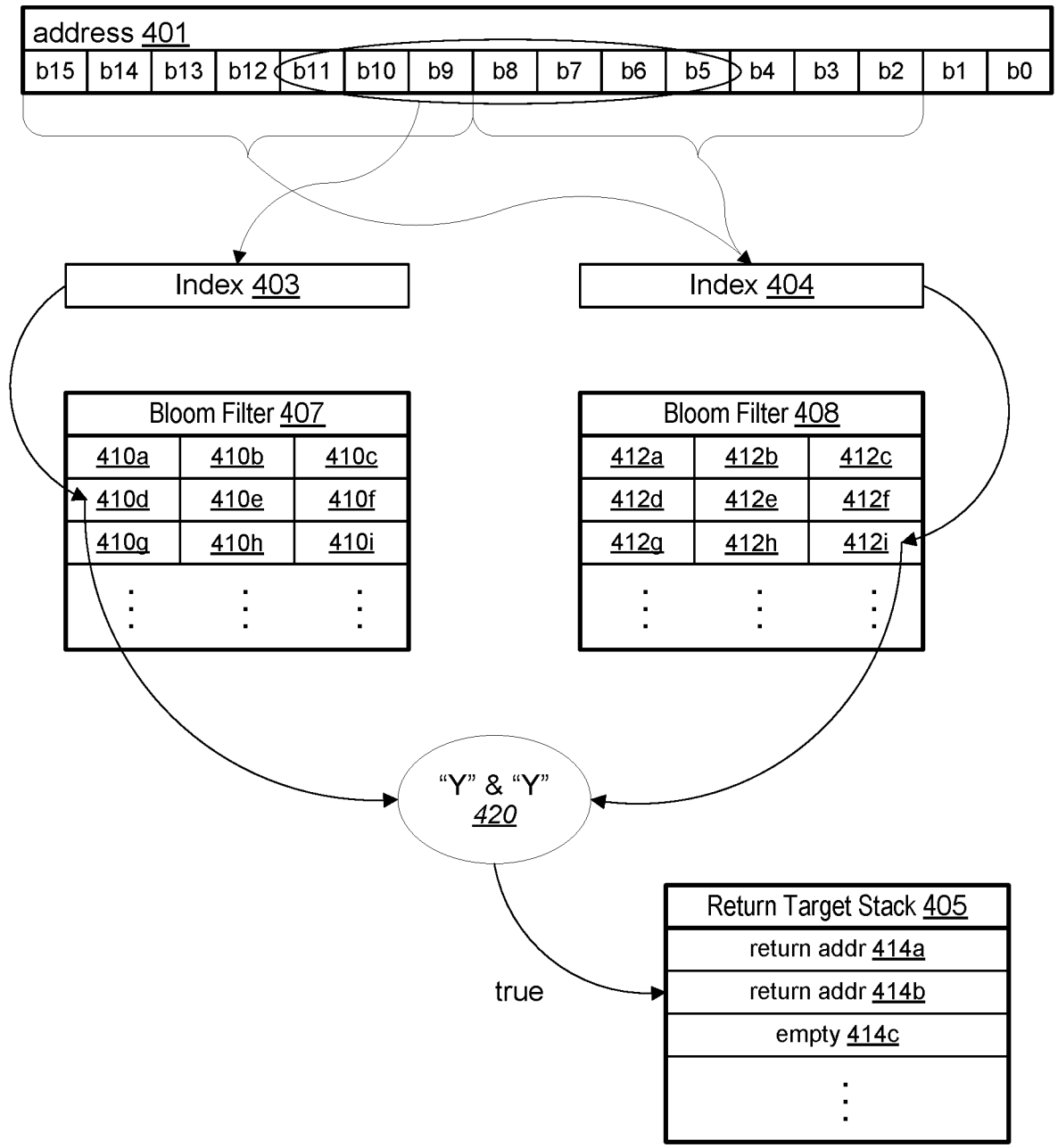
FIG. 4 is an illustration showing a relationship between an address and index values in an embodiment of return instruction prediction tables.

Turning now to FIG. 4, embodiments of tables for predicting presence of a RETURN instruction are illustrated. FIG. 4 includes address 401, return target stack 405, Bloom filters 407 and 408, Bloom filter index values 403 and 404, and comparison logic 420. Return target stack 405 includes multiple entries, including return addr 414a, return addr 414b and empty 414c. Bloom filters 407 and 408 each include a respective set of entries; entries 410a-410i for Bloom filter 407 and entries 412a-412i for Bloom filter 408. The tables and values in FIG. 4 may be used in a processing core, such as, for example, processing core 300 of FIG. 3.

In the illustrated embodiment, address 401 corresponds to an address value used by IFU 310 to fetch one or more instructions, referred to as a current instruction fetch group. Return target circuit 304 uses address 401 to generate two index values, index 403 and index 404. Each index value is generated from a portion of the 16 bits (b0-b15) included in address 401. In the illustrated example, index 403 is generated from bits b5-b11 while index 404 is generated from two groups of bits, b2-b8 and b9-b15. Each of indexes 403 and 404 is seven bits long in the current example, but any suitable length may be used. Return target circuit 304 may simply use bits b5-b11 as they are without further processing, to generate index 403, or may apply a hash function to generate a seven-bit value. Similarly, return target circuit 304 may use a hash function on the two bit groups, consisting of b2-b8 and b9-b15, to generate index 404. For example, return target circuit 304 may exclusive OR the two bit groups together to generate index 404.

It is noted that a "hash function" or "hashing" a value, as used herein, refers to an algorithm wherein bits of an input value are arithmetically and/or logically arranged and/or combined to produce a result with a fixed number of bits. For example, in the illustrated embodiment, a hash function for generating index 403 or index 404 will generate a seven-bit index value to access a corresponding entry in a respective Bloom filter. It is contemplated that many variations of generating two index values from a larger address value may be employed, and the disclosed embodiments are not intended to be limited to the current example.

Upon generating index values 403 and 404, return target circuit 304 accesses each of Bloom filter 407 and Bloom filter 408 using a respective index value, index 403 to access Bloom filter 407 and index 404 to access Bloom filter 408. As used herein, a "Bloom filter" refers to a data structure with a small number of entries, in which each entry may be used to predict if one of a group of a larger number of elements is a member of a set. Generally speaking, each entry of a Bloom filter corresponds to two or more elements in the group. A clear, or initial, value (e.g., "0") in a given Bloom filter entry, indicates that none of the corresponding elements belongs to the set. In contrast, a set value (e.g., "1") indicates that at least one of the two or more corresponding elements belongs to the set. In the illustrated embodiment, Bloom filters 407 and 408 are used to predict if a given value of address 401 corresponds to a RETURN instruction. Each Bloom filter includes 128 entries, although any suitable number of entries may be used in other embodiments. Each of the 128 entries in each Bloom filter corresponds to two or more values of address 401. By using different portions and/or different hashing functions of address 401, each entry in Bloom filter 407 may correspond to a different set of address values than each entry in Bloom filter 408. If, therefore, an entry in Bloom filter 407 and an entry in Bloom filter 408 are both set and both entries correspond to a given value of address 401, then the fetch group corresponding to the given address value has a high probability of including a RETURN instruction.

As shown in FIG. 4, index 403 corresponds to entry 410d in Bloom filter 407 and index 404 corresponds to entry 412i in Bloom filter 408. Comparison logic 420 in return target circuit 304, compares values of entry 410d and entry 412i to a predetermined value, and if both values match, a RETURN instruction is predicted to be included in the current instruction fetch group. Upon a positive prediction of an included RETURN instruction, return target circuit 304 retrieves the return address value residing at the top of return target stack 405, i.e., the last return address stored in return target stack 405. In the illustrated embodiment, return addr 414b is at the top of the stack, and is retrieved, accordingly. After return addr 414b is retrieved, entry 414b may be marked as empty and return addr 414a is now at the top of return target stack 405.

In the illustrated embodiment, entries 414 in return target stack 405 are allocated in response to execution of a CALL instruction. Since CALL and RETURN instructions are generally associated with program subroutines, when a RETURN instruction is fetched, it may be assumed to correspond to the most recent CALL instruction. The return address corresponding to the most recent CALL instruction will be the return address at the top of return target stack 405.

If, in the preceding example, either value in entries 410*d* and 412*i* does not equal the predetermined value, and a RETURN instruction is determined to be included in the current instruction fetch group as the instructions are decoded, then values for both entry 410*d* and entry 412*i* may be set to the predetermined value. By setting both entries to indicate the presence of a RETURN instruction, return target circuitry 304 may be able to predict the inclusion of the RETURN instruction if and when the current fetch group is fetched again. In some embodiments in which more than one instruction is included in a fetch group, an additional determination may be made by return target circuit 304. Entries 410*d* and 412*i* may be set to the predetermined value if the RETURN instruction is detected and is determined to be the oldest branch instruction in the instruction fetch group. In other words, the entries are set if the detected RETURN instruction will be the first taken branch instruction in the instruction fetch group to be executed.

It is noted that some processing cores support out-of-order execution. Out-of-order execution allows a core to execute a second instruction ahead of a first instruction, despite the first instruction coming before the second instruction in the normal program flow, also referred to herein as "program order." The second instruction may be executed ahead of the first instruction if the first instruction is delayed, for example, waiting for a memory access to return an operand to be used with the first instruction. In terms of a core that supports out-of-order execution, older instructions are the instructions that come first in the program order. Entries 410*d* and 412*i* are set to the predetermined value if the RETURN instruction is the oldest taken branch instruction in the fetch group, regardless of which branch instruction may be executed first.

In parallel to return target circuit 304 making a prediction on the presence of a RETURN instruction in the instruction fetch group. BTC 303 is, in one embodiment, determining if the fetch address hits or misses a corresponding entry in its cache. If both return target circuit 304 and BTC 303 fail to return target addresses, but a branch instruction is decoded in the current instruction fetch group, then entries may be updated in either BTC 303 or the Bloom filters of return target circuit 304. If, as described above, an oldest taken branch instruction in the current fetch group is a RETURN instruction, then the values in the corresponding entries 410*d* and 412*i* in Bloom filters 407 and 408, respectively, are set to the predetermined value, and BTC 303 does not cache address 401. On the contrary, if the oldest taken branch instruction in the current fetch group is not a RETURN instruction, and the oldest branch instruction meets the caching conditions, then BTC 303 may update a cache entry to include address 401.

It is noted that the values and tables of FIG. 4 are merely examples to demonstrate operation of an embodiment of a return target circuit. Variations of the illustrated elements of FIG. 4 are contemplated. For example, in other embodiments, address 401 may be of any suitable size to match an address space associated with core 300. Bloom filters 407 and 408 may be located within return target circuit 304 or any other suitable location accessible by return target circuit 304. The illustrated tables are not intended to imply a physical arrangement of data, merely a logical representation.

Figure 5:
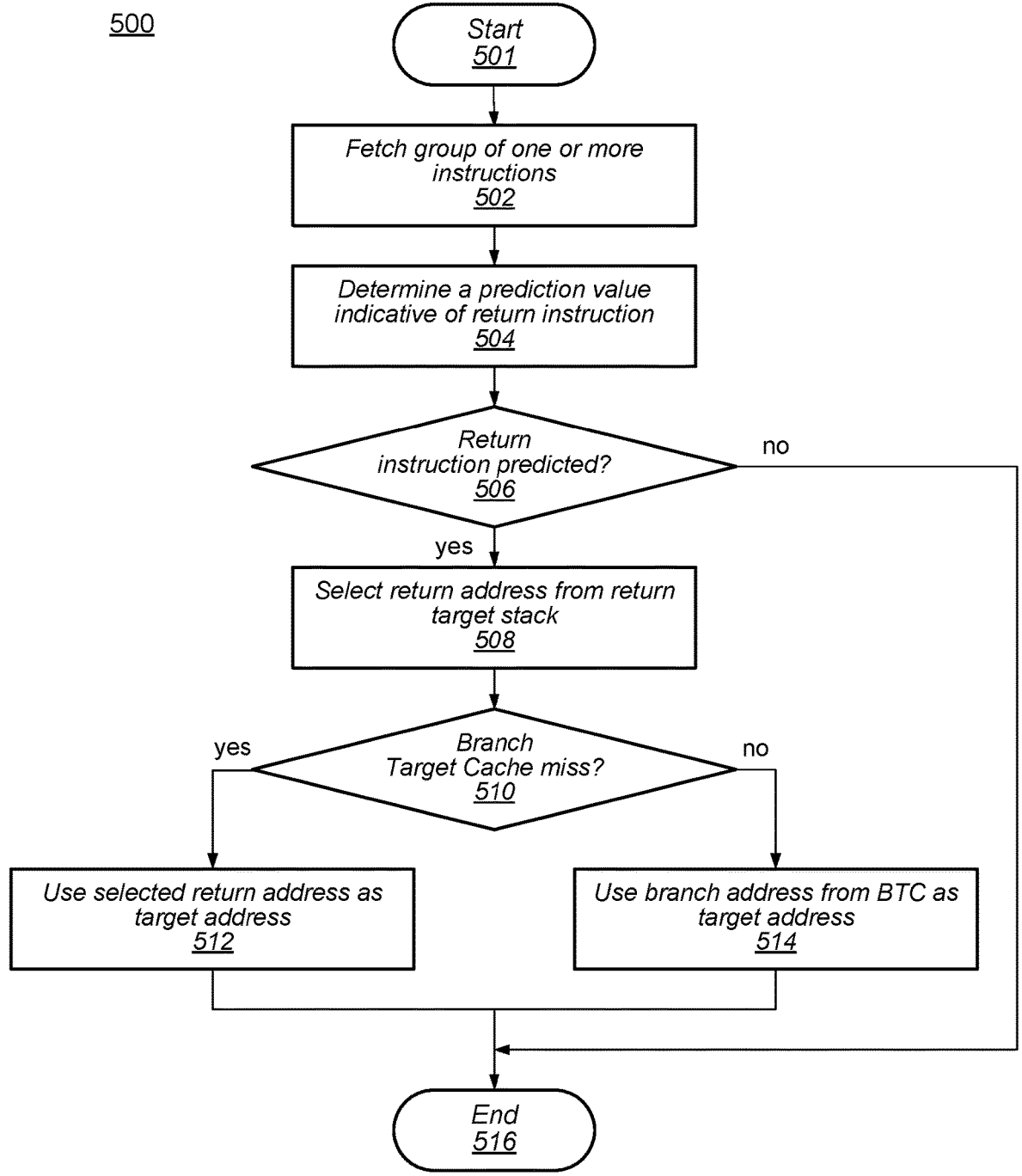
FIG. 5 illustrates a flow diagram of an embodiment of a method for determining a prediction for predicting an occurrence of a return instruction.

Moving now to FIG. 5 a flow diagram of an embodiment of a method for determining a prediction for predicting an occurrence of a return instruction is shown. The operations of method 500 may be applicable to a processing core, such as, for example, core 300 in FIG. 3. Referring collectively to FIG. 3 and the flowchart of FIG. 5, the illustrated embodiment of the method begins in block 501.

A group of one or more instructions is fetched (block 502). Utilizing a fetch address, IFU 310 fetches a group of one or more instructions, referred to herein as a fetch group. Instructions may be fetched from a program/system memory or from one of one or more cache memories. The fetch group may be stored in fetch buffer 311.

A prediction value is determined, indicating if a RETURN instruction is included in the current fetch group (block 504). In the illustrated embodiment, return target circuit 304 reads values in prediction tables, also referred to herein as Bloom filters, to determine the prediction value. For example, prediction tables may correspond to Bloom filters 407 and 408 in FIG. 4. An entry corresponding to index 403 is read from Bloom filter 407, and, likewise, an entry corresponding to index 404 is read from Bloom filter 408. As described above in regards to FIG. 4, the values for index 403 and index 404 may be determined using different portions of the fetch address. The values in each indexed entry are compared to a predetermined value to determine the prediction value.

Further operations of method 500 may depend on the prediction value (block 506). If the read values from the entries, e.g., entry 410*d* and entry 412*i*, equal the predetermined value, the prediction value will be "positive," i.e., will indicate that a RETURN instruction is predicted to be included in the current fetch group. If, however, either value of the two entries is not equal to the predetermined value, then the prediction value will be "negative," i.e., will indicate that a RETURN instruction is not predicted in the current fetch group. If the prediction value is positive, then the method moves to block 508 to select a return address. Otherwise, if the prediction value is negative, the method ends in block 516.

In response to a positive prediction value, a return address is read from a return target stack (block 508). In the illustrated embodiment, a fetched RETURN instruction is assumed to correspond to the most recently executed CALL instruction. The return address corresponding to the most recently executed CALL instruction will be the return address at the top of return target stack 305. Accordingly, return target circuit 304 retrieves the last return address stored in return target stack 305. In some embodiments, the retrieved return address may be stored in a register until requested from branch prediction unit 302. In other embodiments, return target circuit 304 may send the retrieved return address to branch prediction unit 302 without waiting.

Further operations of the method may depend on a branch target cache (block 510). In the illustrated embodiment, branch prediction circuits 301 selects either the return address from return target circuit 305 or a branch target address determined by BTC 303. If the fetch address hits an entry in BTC 303, then the method moves to block 514 to use the address from BTC 303. Otherwise, if the fetch address generates a miss, then the method moves to block 512 to use the return address from return target circuit 304.

In response to a branch target cache miss, the retrieved return address is used (block 512). In one embodiment, if BTC 303 generates a miss for the fetch address, then BPU 302 uses the return address from return target circuit 304. In various embodiments, BPU 302 may request the return address from return target circuit 304 upon determining that the fetch address missed in BTC 303, or may have already received the return address once return target circuit 304 retrieved the return address from return target stack 305. The method ends in block 516.

In response to a branch target cache hit, a branch address from the branch target cache is used (block 514). If BTC 303 generates a hit for the fetch address, then BTC 303 retrieves a corresponding cached branch address. BPU 302 uses the branch address provided by BTC 303 as the target address of the predicted RETURN instruction. The method ends in block 516.

It is noted that the method illustrated in FIG. 5 is an example for demonstrating the disclosed concepts. Operations are illustrated as occurring in a sequential fashion. In other embodiments, however, some of the operations may be performed in parallel or in a different sequence. Additional operations may be included in some embodiments.

Figure 6:
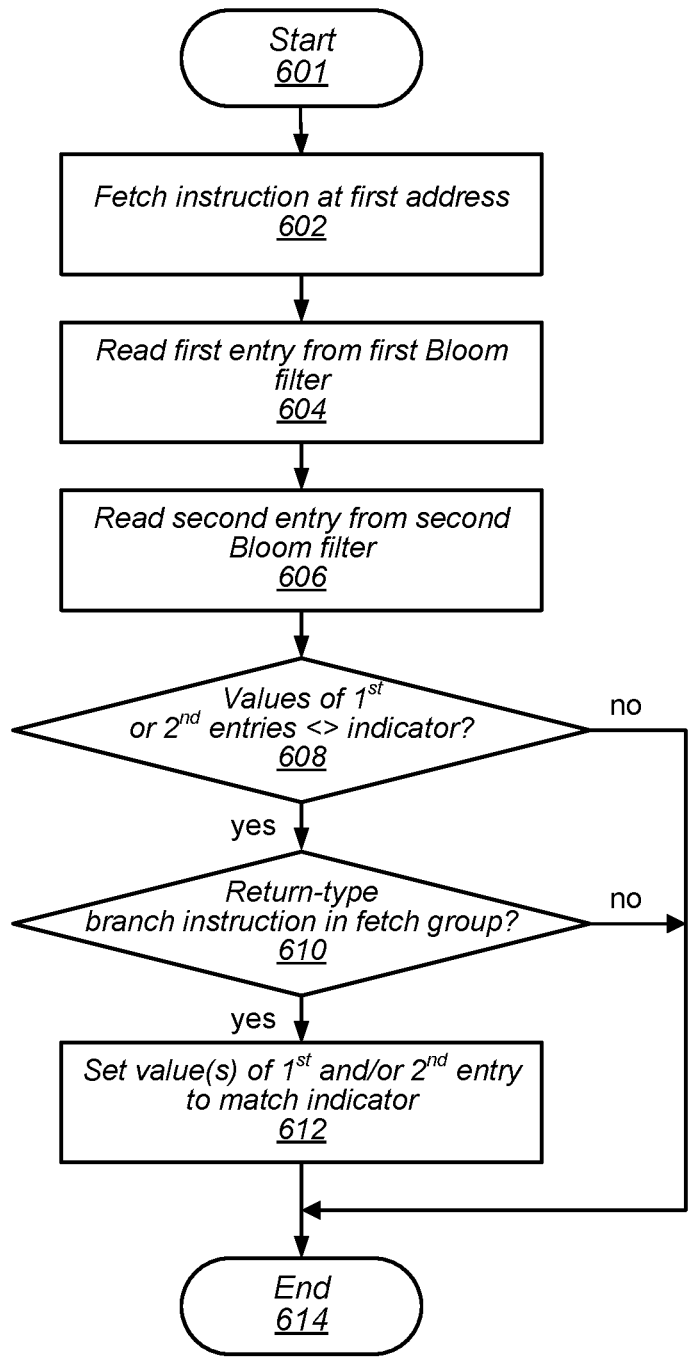
FIG. 6 is a flow diagram illustrating an embodiment of a method for updating return instruction prediction tables.

Turning to FIG. 6 a flow diagram illustrating an embodiment of a method for updating return instruction prediction tables is illustrated. Method 600 may be applied to a processing core, such as, for example, core 300 in FIG. 3 in order to access and update prediction tables, such as, e.g., Bloom filters 407 and 408 in FIG. 4. Referring collectively to FIG. 3, FIG. 4, and FIG. 6, method 600 begins in block 601.

One or more instructions are fetched as part of a fetch group (block 602). Utilizing a fetch address, IFU 310 retrieves one or more instructions as a fetch group. Instructions may be fetched from a program/system memory or from a cache memory. The fetch group may be stored in fetch buffer 311.

A first entry is read from a first Bloom filter (block 604). In the illustrated embodiment, return target circuit 304, using index 403 derived from address 401, accesses entry 410*d* in Bloom filter 407. Index 403 may be derived from a portion of address 401 and, in various embodiments, may or may not be derived using a hash function. A value stored in entry 410*d* is read and compared to a predetermined value.

A second entry is read from a second Bloom filter (block 606). Similar to reading the first entry, return target circuit 304, uses index 404, also derived from address 401, to access entry 412*i* in Bloom filter 408. It is noted that index 404 may be derived from a different portion of address 401 than index 403, and, as with index 403, may or may not be derived using a hash function. A value stored in entry 412*i* is read and compared to the predetermined value.

Further operation of method 600 may depend on the values read from the first and second entries (block 608). Return target circuit 304, after comparing the values in entries 410*d* and 412*i*, determines if either value does not equal the predetermined value. If both values equal the predetermined value, then the method ends in block 614. Otherwise, the method moves to block 610 to determine if a RETURN instruction is included in the fetch group.

Method 600 may depend upon types of instructions in the fetch group (block 610). Since at least one of the values of entries 410*d* and 412*i* is not equal to the predetermined value, a RETURN instruction has not been detected in the current fetch group since Bloom filters 407 and 408 were last cleared. This may be due to the current fetch group not including a RETURN instruction or due to the fetch group being fetched for the first time since Bloom filters 407 and 408 were last cleared. After the instructions in the fetch group are decoded or pre-decoded, if a RETURN instruction is not detected in the fetch group, the method ends in block 614. Otherwise, if a RETURN instruction is detected in the fetch group, the method moves to block 612 to set the values of entries 410*d* and 412*i*. In some embodiments, the method may not move to block 612 unless a detected RETURN instruction is the oldest taken branch instruction in the fetch group.

The values of entries 410*d* and 412*i* are set (block 612). After determining that a RETURN instruction should be predicted in the current fetch group, values of both entries 410*d* and 412*i* are set to the predetermined value. In some embodiments, each entry may include a single data bit and the predetermined value may be "1" while a clear value may correspond to "0." In other embodiments, any suitable values may be used. Under some conditions, either entry 410*d* or entry 412*i* may already be set to the predetermined value due to a previous fetch of another RETURN instruction in another fetch group with a fetch address that corresponds to one of the two entries. For example, referring to FIG. 4, the address of the current fetch group may share values for bits b5 to b11 with an address for a second fetch group, while other bits of the two addresses may differ. Since address bits b5 to b11 match, both addresses would generate the same value for index 403, and therefore would both correspond to entry 410*d*. If the second fetch group included a RETURN instruction as an oldest taken branch instruction and was fetched before the current fetch group, then entry 410*d* would already be set to the predetermined value.

It is noted that method 600 illustrated in FIG. 6 is an example embodiment. In other embodiments, operations may be performed in a different order than shown. Some operations, such as, for example, blocks 604 and 606, may occur in parallel.

Figure 7:
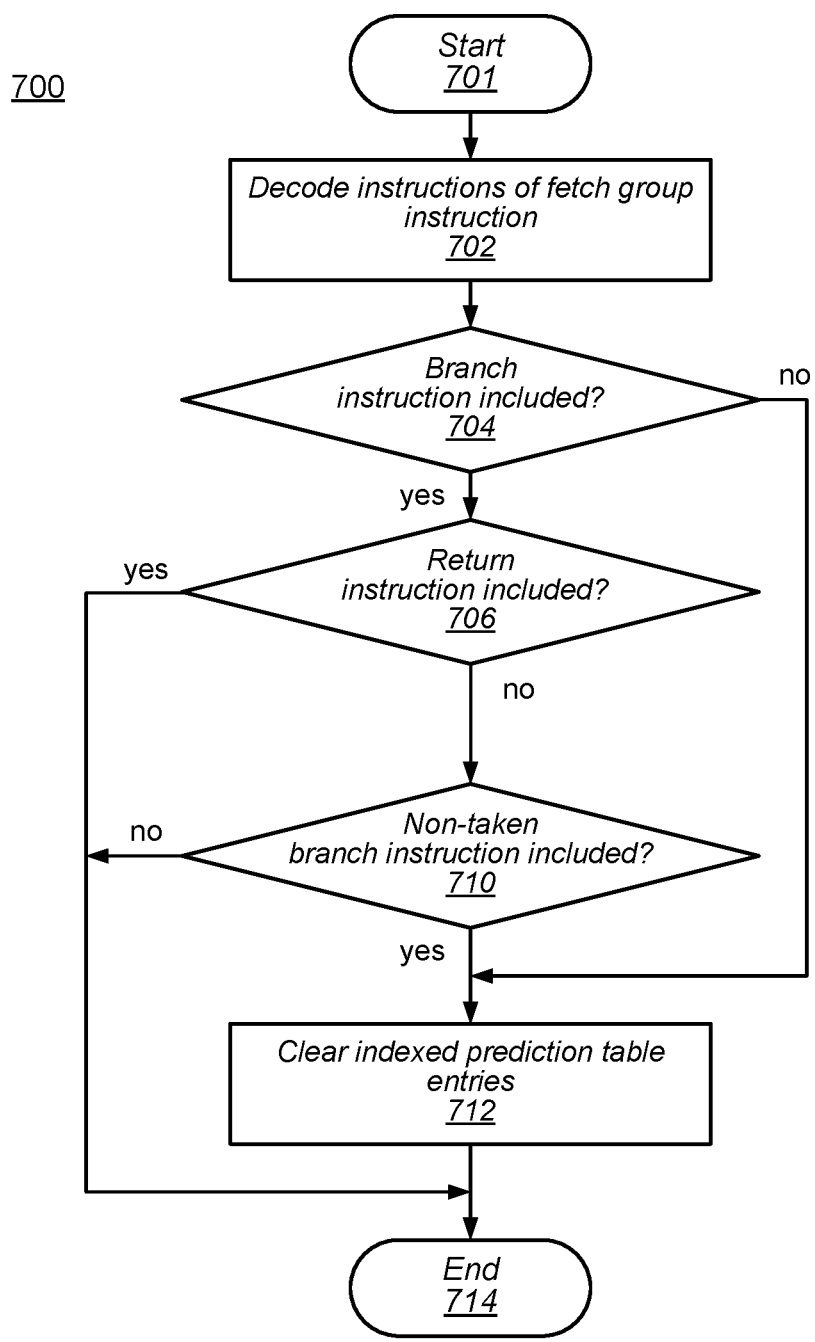
FIG. 7 shows a flow diagram of an embodiment of a method for clearing entries in return instruction prediction tables.

Moving to FIG. 7, a flow diagram illustrating an embodiment of a method for clearing entries in return instruction prediction tables is shown. Operations of method 700 may correspond to operations performed in block 512 in method 500 of FIG. 5. Method 700 may be applied to a processing core, such as, for example, core 300 in FIG. 3, and to return instruction prediction tables, such as, e.g., Bloom filters 407 and 408 in FIG. 4. Referring collectively to FIG. 3, FIG. 4, and FIG. 7, method 700 begins in block 701 with a RETURN instruction having been predicted in a current fetch group based on entries in one or more prediction tables.

Instructions of the current fetch group are decoded (block 702). The instructions fetched as part of the current fetch group are decoded or pre-decoded in preparation for execution by execution unit 320. Decoding/pre-decoding may be performed by IFU 310 or by a scheduling unit (not shown in FIG. 3) coupled to fetch buffer 311. The instructions are at least pre-decoded such that various branch instructions may be identified.

Further operations of method 700 may depend on the types of instructions identified in the current fetch group (block 704). The at least pre-decoded instructions are identified as branch instructions or other types of instructions. If at least one instruction is a branch instruction, then the method moves to block 706 to determine a type of branch instruction. Otherwise, the method moves to block 712 to clear a corresponding entry in the one or more prediction tables.

Method 700 may further depend on what type of branch instruction was identified in the current fetch group (block 706). The identified branch instruction is evaluated to determine if it is a RETURN instruction. If the branch instruction is not identified as a RETURN instruction, then the method moves to block 710 to determine if the branch instruction corresponds to a non-taken branch instruction. Otherwise, the method ends in block 714.

In response to a determination that the branch instruction is not identified as a RETURN instruction, further operations of method 700 may depend on if the identified branch instruction is taken or not (block 710). If the identified branch instruction is determined to be a conditional branch instruction (a branch instruction in which the branch is taken only if one or more conditions in core 300 are true) and the conditions result in the branch being taken, then a target address may be determined by BTC 303 or BPU 302, and the method ends in block 714. Otherwise, if the conditional branch is determined not to be taken, then the method moves to block 712 to clear the corresponding entry in the one or more prediction tables.

If a branch instruction is not included or a non-taken conditional branch instruction is included in the current fetch group, then entries corresponding to the address used for the current fetch group are cleared (block 712). Prediction table entries that erroneously indicated that the current fetch group included a RETURN instruction, such as, for example entries 410*d* and 412*i* in FIG. 4, may be reset to an initial value, different from the predetermined value used in method 500. The method ends in block 714.

It is noted that the method illustrated in FIG. 7 is merely an example. Operations are illustrated as occurring in a sequential fashion. In other embodiments, however, some of the operations may be performed in parallel or in a different sequence. Additional operations may be included in some embodiments.

Figure 8:
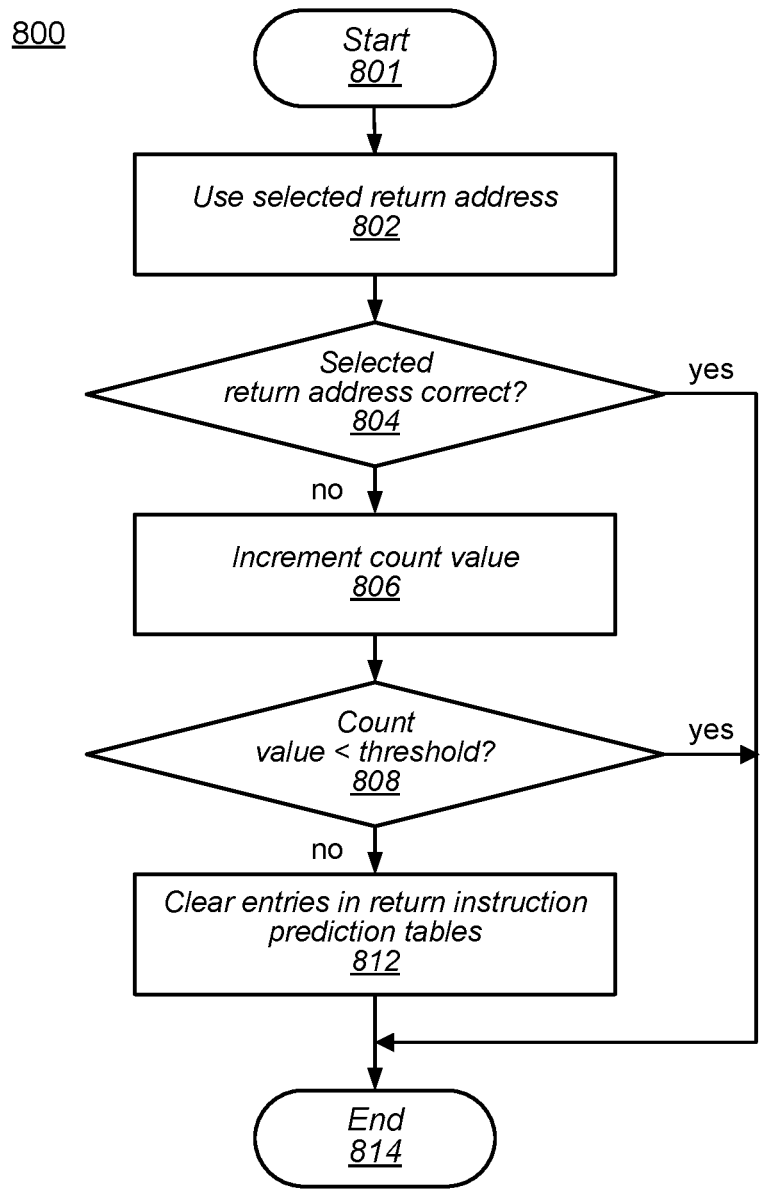
FIG. 8 is a flow diagram showing an embodiment of a method for re-initializing return instruction prediction tables.

Turning now to FIG. 8, a flow diagram for re-initializing return instruction prediction tables is illustrated. In the present embodiment, method 800 may correspond to operations performed as part of, or in parallel with block 512 in the method of FIG. 5. Operations of method 800 may be applicable to core 300 in FIG. 3 and to prediction tables such as, e.g., Bloom filters 407 and 408 in FIG. 4. Referring collectively to FIG. 3, FIG. 4, and the flowchart of FIG. 8, the illustrated embodiment of the method begins in block 801 after a RETURN instruction has been predicted in a current fetch group.

In response to having a RETURN instruction predicted for the current fetch group, a return address is used for execution of a branch instruction in the fetch group (block 802). In the illustrated embodiment, the return address is previously selected by return target circuit 304. In addition to return target circuit 304 predicting a RETURN instruction, BTC 303 generates a miss for the address of the current fetch group. As a result, a RETURN instruction is predicted in the current fetch group. When a branch instruction in the current fetch group is ready for execution, the selected return address is used as the target address for the branch.

Further operations of method 800 may depend on the selected return address (block 804). A determination is made if the selected return address is correct for the branch instruction. If the branch instruction is a RETURN instruction and the selected return address is the correct target address for the RETURN instruction, then the method ends in block 814. If, however, either the detected branch instruction is not a RETURN instruction, or if it is a RETURN instruction but the return address selected from return target stack 305 is incorrect, then the method moves to block 806 to increment a count value.

It is noted that a misprediction of a RETURN instruction in the fetch group (also referred to herein as a "false hit") may occur for various reasons. In one embodiment, the return instruction prediction tables, such as, e.g., Bloom filters 407 and 408, may not include enough entries to provide a unique entry or set of entries for every conceivable address that IFU 310 may access. If, for example, each Bloom filter includes 128 entries, then there are only 16384 (128×128) combinations of entries from each Bloom filter. If the program memory space includes 16 gigabytes, then many fetch addresses may share at least one common entry in one of the two Bloom filters. For example, a first fetch address may correspond to entry 410*d* in Bloom filter 407 and entry 412*e* in Bloom filter 408, while a second fetch address may correspond to entry 410*g* in Bloom filter 407 and entry 412*i* in Bloom filter 408. If both the first and second fetch groups include a RETURN instruction, then all four entries are set to the predetermined value. If a third fetch address corresponds to entries 410*d* and 412*i*, then return target circuit 304 will, in the illustrated embodiment, predict a RETURN instruction for the third fetch group, regardless if a RETURN instruct is present in the fetch group or not. It is contemplated that additional Bloom filters may be used to increase a number of combinations of entries. Accordingly, increasing a number of Bloom filters and supporting logic may increase a size and complexity of core 300, and a suitable balance of size and performance may determine the number of Bloom filters used in a given core.

In response to the determination that return target circuit 304 generated a false hit, a count value is incremented (block 806). The count value, in the illustrated embodiment, is used to track a number of false hits from return target circuit 304. In various embodiments, the count value may be implemented as a hardware counter circuit in core 300, or as a data value stored in a memory location accessible by core 300.

Continuing operation of method 800 may depend on the count value (block 808). Each time the count value is incremented, it is, in one embodiment, compared to a threshold value. If the count value reaches the threshold, then the method moves to block 812 to clear the entries in each of the one or more return instruction prediction tables. Otherwise, if the count value is less than the threshold value, the method ends in block 814.

Entries in each of the one or more return instruction prediction tables are cleared (block 812). The count value reaching the threshold value may be an indication that too many of the entries in the prediction tables (e.g., Bloom filters 407 and 408), have been set to the predetermined value, thereby causing too many false hits from return target circuit 304. Clearing the entries in both Bloom filters may result in more efficient operation of return target circuit 304. In one embodiment, each entry in Bloom filters 407 and 408 may include a single data bit. The predetermined value may correspond to "1," and clearing the entries, therefore, corresponds to setting each entry to "0." In other embodiments, additional bits may be included and any suitable values may be used as the predetermined value and the cleared value.

It is noted that the method illustrated in FIG. 8 is an example to demonstrate the disclosed concepts. Operations are illustrated as occurring in a sequential fashion. In other embodiments, however, some operations may be performed in parallel or in a different sequence. Additional operations may also be included in some embodiments.

Figure 9:
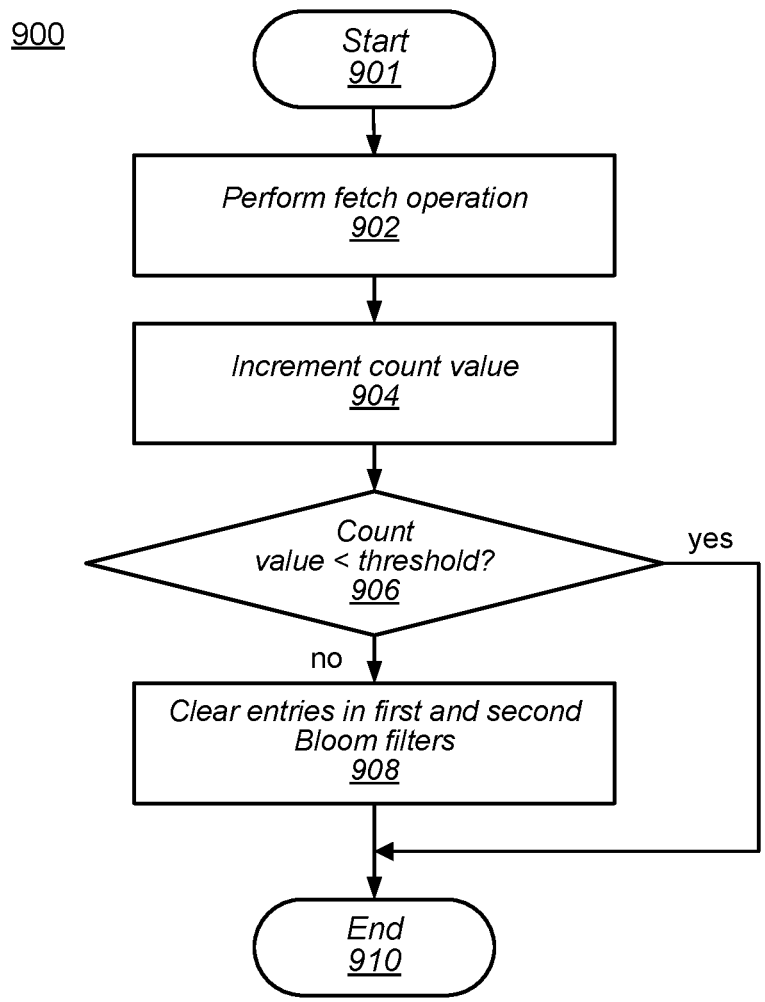
FIG. 9 illustrates a flow diagram of an alternate embodiment of a method for re-initializing return instruction prediction tables.

Moving now to FIG. 9, a flow diagram for a flow diagram of an alternative embodiment of a method for re-initializing return instruction prediction tables is shown. Similar to method 800 in FIG. 8, the operations of method 900 may correspond to operations performed as part of, or in parallel with block 512 in the method of FIG. 5. Method 900 may also be applicable to core 300 in FIG. 3 and to return instruction prediction tables such as, e.g., Bloom filters 407 and 408 in FIG. 4. Referring collectively to FIG. 3, FIG. 4, and the flowchart of FIG. 9, method 900 begins in block 901.

A fetch operation is performed to retrieve one or more instructions as a current fetch group (block 902). In one embodiment, IFU 310 using a given fetch address to retrieve multiple instructions in a single fetch operation. IFU 310 stores the retrieved instructions in fetch buffer 311.

A count value is incremented (block 904). In response to the fetch operation, a count value is incremented to track a number of fetch operations since Bloom filters 407 and 408 have been cleared. The count value, as described above in regards to block 806 in FIG. 8, may be implemented as a data value stored in a memory location accessible by core 300, or as a hardware counter circuit in core 300.

Subsequent operations of method 900 may depend on the count value (block 906). In the illustrated embodiment, when the count value is incremented, it is compared to a threshold value. If the count value reaches the threshold, then the method moves to block 908 to clear the entries in each of Bloom filters 407 and 408. Otherwise, if the count value is less than the threshold value, the method ends in block 910.

Entries in each of the return instruction prediction tables are cleared (block 908). By clearing the entries in both Bloom filters after the threshold number of fetch operations, return target circuit 304 may be more efficient in determining RETURN instruction predictions. As described above in regards to block 812 of FIG. 8, the predetermined value may correspond to "1," and clearing the entries, therefore, corresponds to setting each entry to "0." In other embodiments, additional bits may be included and any suitable values may be used as the predetermined value and the cleared value.

It is noted that the method illustrated in FIG. 9 is merely an example. Operations are illustrated as occurring in a sequential fashion. In other embodiments, operations may be performed in a different sequence or in parallel. Additional operations may be included in some embodiments.

It is also noted that methods 800 and 900 may be used in combination in one embodiment. Method 800 may be used to reset the return instruction prediction tables due to reaching 'X' number of prediction errors. Method 900, meanwhile, may be used to ensure that the return instruction prediction tables are reset at least every 'Y' number of fetch cycles. For example 'X' may be set to a relatively low number, such as 5 or 10, while 'Y' may be set to a higher number, such as 100 or 1000. Application of method 800 may allow for setting a suitable tolerance for missed predictions whereas application of method 900 may allow for setting a suitable tolerance for old prediction values.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a branch target cache configured to store one or more branch addresses;
 a memory configured to store a return target stack including one or more return addresses;
 first and second Bloom filters; and
 a circuit configured to:
  in response to an initial fetch of a particular group of instructions:
   determine that a return instruction in the particular group has been decoded;
   determine, based on whether the return instruction is an initial taken branch instruction in the particular group, whether to store an indication of the initial taken branch instruction either in the first Bloom filter and the second Bloom filter or in an entry in the branch target cache; and
   in response to a determination that the return instruction is the initial taken branch instruction, store a first value in the first Bloom filter and a second value in the second Bloom filter; and
  in response to a subsequent fetch of the particular group of instructions:
   retrieve the first and second values that are stored, respectively, in the first and second Bloom filters;
   in response to a determination, using the first and second values, that the particular group of instructions includes the return instruction, select a return address from the return target stack;
   determine whether an entry exists in the branch target cache for the particular group of instructions;
   in response to a determination that the entry exists, use a target address included in the existing entry; and
   in response to a determination that no entry exists, use the selected return address as a target address for the return instruction.

2. The apparatus of claim 1, wherein to store the first value in the first Bloom filter and the second value in the second Bloom filter, the circuit is further configured to store a particular predetermined value in the first Bloom filter and in the second Bloom filter.

3. The apparatus of claim 1, wherein the circuit is further configured to store the return address in the return target stack in response to a determination that a previously fetched instruction is a call instruction.

4. The apparatus of claim 1, wherein the circuit is further configured to:
 in response to a fetch of a different group of instructions, different than the particular group, retrieve the first and second values from the first and second Bloom filters, respectively, based on a fetch address that is different than a fetch address used for the particular group; and
 clear the first and second values in the first and second Bloom filters, respectively, in response to a determination that the different group does not include a return instruction.

5. The apparatus of claim 1, wherein to retrieve the first and second values that are stored, respectively, in the first and second Bloom filters, the circuit is further configured to:
   access a particular entry in the first Bloom filter using a first portion of an address value corresponding to the particular group of instructions; and
   access a different entry in the second Bloom filter using a second portion of the address value.

6. The apparatus of claim 5, wherein the circuit is further configured to initialize the first Bloom filter and the second Bloom filter in response to a determination that a predetermined number of groups of instructions have been fetched.

7. The apparatus of claim 5, wherein the circuit is further configured to:
   increment a count value in response to a determination that a given selected return address is incorrect for a corresponding return instruction; and
   initialize the first Bloom filter and the second Bloom filter in response to a determination that the count value has reached a predetermined threshold.

8. A method, comprising:
   in response to fetching, at a first time, a particular group of instructions:
      determining that a return instruction in the particular group has been decoded;
      determining, based on whether the return instruction is an initial taken branch instruction in the particular group, whether to store an indication of the initial taken branch instruction either in a first and a second Bloom filter or in an entry in a branch target cache; and
      storing a first value in the first Bloom filter and a second value in the second Bloom filter to indicate that the return instruction is the initial taken branch instruction in the particular group; and
   in response to fetching, at a second time that is subsequent to the first time, the particular group of instructions:
      retrieving the first and second values that are stored, respectively, in the first and second Bloom filters;
      in response to determining, using the first and second values, that the particular group of instructions includes the return instruction, selecting a return address from a return target stack;
      determining whether an entry exists in the branch target cache for the particular group of instructions; and
      in response to determining that no entry exists, using the selected return address as a target address for the return instruction.

9. The method of claim 8, further comprising:
   in response to fetching, at a third time that is subsequent to the second time, a different group of instructions, retrieving third and fourth values from the first and second Bloom filters, respectively, based on a different fetch address; and
   in response to determining that an entry exists for the different group of instructions in the branch target cache, selecting a branch address included in the existing entry for the different group of instructions as a target address for a branch instruction included in the different group of instructions.

10. The method of claim 8, further comprising storing the return address in the return target stack in response to a determination that a previously fetched instruction is a call instruction.

11. The method of claim 8, further comprising:
   fetching a different group of instructions, different than the particular group;
   retrieving the first and second values from the first and second Bloom filters, respectively, based on a fetch address that is different than a fetch address used for the particular group; and
   clearing the first and second values from the first and second Bloom filters, respectively, in response to determining that the different group does not include a return instruction.

12. The method of claim 8, wherein retrieving the first and second values from the first and second Bloom filters, respectively, comprises:
   accessing a first entry in the first Bloom filter using a first portion of an address value corresponding to the particular group of instructions; and
   accessing a second entry in the second Bloom filter using a second portion of the address value.

13. The method of claim 12, further comprising initializing the first Bloom filter and the second Bloom filter in response to a determination that a predetermined number of groups of instructions have been fetched.

14. The method of claim 12, further comprising:
   incrementing a count value in response to a determination that a given selected return address is incorrect for a corresponding return instruction; and
   initializing the first Bloom filter and the second Bloom filter in response to a determination that the count value has reached a predetermined threshold.

15. A system, comprising:
   an instruction fetching circuit configured to fetch a group of instructions;
   an execution circuit configured to execute issued ones of the group of instructions;
   a branch prediction unit including a plurality of prediction circuits, wherein a particular one of the plurality of prediction circuits includes first and second Bloom filters;
   wherein the particular prediction circuit of the plurality of prediction circuits is configured to:
      in response to an initial fetch of the group of instructions:
         determine that a return instruction in the group of instructions has been decoded;
         determine, based on whether the return instruction is an initial taken branch instruction, whether to store an indication of the initial taken branch instruction either in the first Bloom filter and the second Bloom filter or in an entry in a branch target cache; and
         in response to a determination that the return instruction is the initial taken branch instruction, store a first value in the first Bloom filter and a second value in the second Bloom filter; and
      in response to a subsequent fetch of the group of instructions:
         retrieve the first and second values from the first and second Bloom filters, respectively;
         in response to a determination, using the first and second values, that the group of instructions includes the return instruction, select a return address from a return target stack;
   wherein a different prediction circuit of the plurality of prediction circuits is configured to, in response to the subsequent fetch, determine, for the group of instructions, whether an entry exists for the group of instructions in the branch target cache; and
   wherein the branch prediction unit is configured to:

in response to a determination that the entry exists for the group of instructions in the branch target cache, use a target address included in the existing entry; and use the selected return address as a target address for the return instruction in response to a determination that no entry exists for the group of instructions in the branch target cache.

16. The system of claim 15, wherein to store the first value in the first Bloom filter and the second value in the second Bloom filter, the particular prediction circuit is further configured to store a particular predetermined value in the first Bloom filter and in the second Bloom filter.

17. The system of claim 15, wherein the particular prediction circuit is further configured to store the return address in the return target stack in response to a determination that a previously fetched instruction is a call instruction.

18. The system of claim 15, wherein to retrieve the first and second values from the first and second Bloom filters, respectively, the particular prediction circuit is further configured to:

access a particular entry in the first Bloom filter using a first portion of an address value corresponding to the group of instructions; and access a different entry in the second Bloom filter using a second portion of the address value.

19. The system of claim 18, wherein the particular prediction circuit is further configured to initialize the first Bloom filter and the second Bloom filter in response to a determination that a predetermined number of groups of instructions have been fetched.

20. The system of claim 18, wherein the particular prediction circuit is further configured to:

increment a count value in response to a determination that a given selected return address is incorrect for a corresponding return instruction; and initialize the first Bloom filter and the second Bloom filter in response to a determination that the count value has reached a predetermined threshold.

* * * * *

UNITED STATES PATENT AND TRADEMARK OFFICE
CERTIFICATE OF CORRECTION

PATENT NO. : 11,099,849 B2  
APPLICATION NO. : 15/254648  
DATED : August 24, 2021  
INVENTOR(S) : Chou et al.

Page 1 of 1

It is certified that error appears in the above-identified patent and that said Letters Patent is hereby corrected as shown below:

On the Title Page

Column 1, under item (73) Assignee, Line 2, delete "Redwood Shores (CA)" and insert -- Redwood Shores, CA (US) --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*